Figure 1:
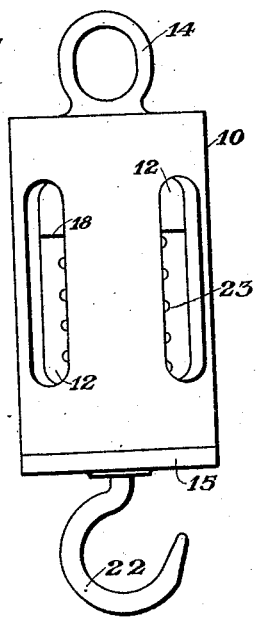

J. LOPEZ.
DRAFT COUPLING.
APPLICATION FILED MAY 11, 1920.

1,408,955.

Patented Mar. 7, 1922.

Witness:
J. M. Jester

Inventor
Joaquin Lopez
By Victor J. Evans
Attorney

UNITED STATES PATENT OFFICE.

JOAQUIN LOPEZ, OF ANSONIA, CONNECTICUT.

DRAFT COUPLING.

1,408,955.   Specification of Letters Patent.   Patented Mar. 7, 1922.

Application filed May 11, 1920. Serial No. 380,590.

*To all whom it may concern:*

Be it known that I, JOAQUIN LOPEZ, a citizen of Cuba, Habana, residing at Ansonia, in the county of New Haven and State of Connecticut, have invented new and useful Improvements in Draft Couplings, of which the following is a specification.

This invention relates to draft couplings and has for its object the provision of a coupling adapted for interposition between the device or object to be drawn and the device which effects the drawing, the purpose being to provide spring shock absorbing means whereby to prevent sudden strain.

An important object is the provision of a device of this character which includes an enclosing shell which forms a housing for the shock absorbing spring, the device being furthermore so constructed as to provide shoulders which engage when the spring is compressed to its maximum degree.

An additional object is the provision of a device of this character which will be simple and inexpensive in manufacture, highly efficient in use, durable in service, and a general improvement in the art.

Figure 2:
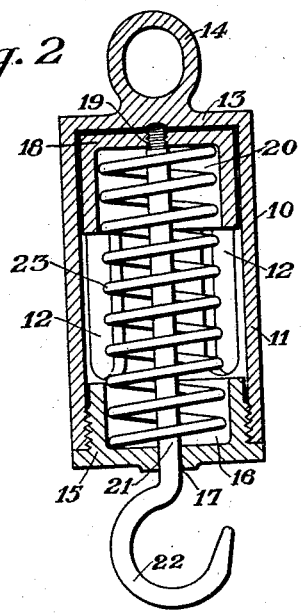
Figure 3:
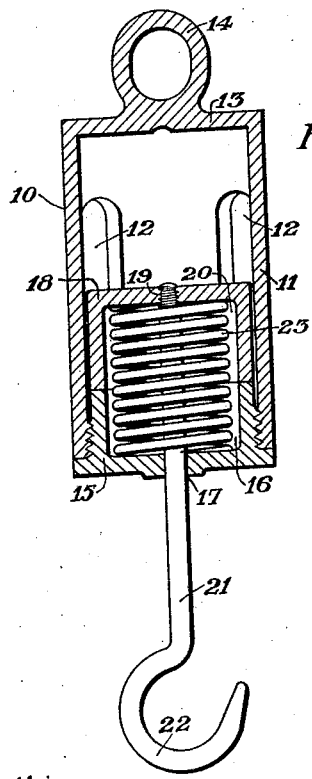
Figure 4:
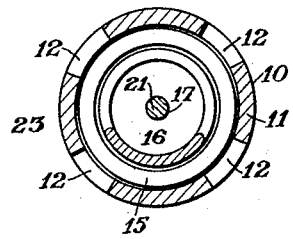

With the above and other objects and advantages in view, the invention consists in the details of construction to be hereinafter more fully described and claimed, and illustrated in the accompanying drawings in which Figure 1 is a side elevation of the device, Figure 2 is a longitudinal sectional view with the parts in normal position, Figure 3 is a similar view showing the spring fully compressed, and Figure 4 is a central cross sectional view.

Referring more particularly to the drawings, the numeral 10 designates one portion of the device which is formed as a cylindrical shell 11 provided in its periphery with a plurality of openings 12, having one end open and internally threaded, and having its other end closed, as shown at 13, and formed with an eye or loop 14 adapted for connection of a chain or rope. The open end of the shell 11 is closed by an externally threaded plug 15 screwed thereinto and provided with a recess 16 and a hole 17.

Disposed within the shell 11 is a cup-like member 18 having a threaded hole 19 and a recess 20. The numeral 21 designates a rod which is slidable through the hole 17 and which is threaded into the hole 19 and the outer end of this rod is formed with a hook 22 adapted for connection of a pulling chain or rope. A coil spring 23 surrounds the rod 21 and has its end portions engaged within the recesses 16 and 20.

In the use of the device it will be seen that it is interposed between drawing and drawn objects or is interposed in a draft chain or cable, or the like, the eye 14 and hook 22 providing for the connection. When strain is placed upon the draft device, chain or rope, it will be seen that the rod 21 and cup member 18 will move longitudinally within the shell against the resistance of the spring 23, thereby taking up or absorbing the strain or shock. When the spring 23 is fully compressed, as might occur in the event of a heavy strain, it will be seen that the open end of the cup member 18 will engage against the inner end of the plug 15.

From the foregoing description and a study of the drawings it will be apparent that I have thus provided an inexpensive, simple, and yet highly efficient shock absorbing device for taking up the strain in draft connections.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising a body formed as a cylindrical shell open and internally threaded at one end and having its other end closed and formed with an attaching eye, a plug threaded into and closing the open end of said body and provided with a recess and a central hole, a cup member slidable within said body and formed with a recess and a central threaded hole, a rod slidable through said first named hole and having one end screwed into said threaded hole of the cup and having its other end formed as an attaching hook, and a coil spring surrounding said rod and having its ends seating within said recesses, the open end of the cup being engageable with the plug to serve as a stop.

In testimony whereof I affix my signature.

JOAQUIN LOPEZ.